United States Patent Office 3,660,479
Patented May 2, 1972

3,660,479
PRODUCTION OF UNSATURATED ALDEHYDES AND ACIDS
John A. Ondrey, Tyler, Tex., and Harold E. Swift, Gibsonia, Pa., assignors to Gulf Research & Development Company, Pittsburgh, Pa.
No Drawing. Filed Aug. 15, 1969, Ser. No. 850,628
Int. Cl. C07c 51/32
U.S. Cl. 260—530 N       10 Claims

ABSTRACT OF THE DISCLOSURE

A method of oxidizing propylene and isobutene to the corresponding unsaturated aldehydes and acids and for oxidizing the unsaturated aldehydes of propylene and isobutene to the corresponding unsaturated acids by the vapor phase reaction with molecular oxygen in the presence of a catalyst of cobalt molybdate promoted with a composition of lead, tellurium and oxygen. Propylene is converted to acrolein and acrylic acid and acrolein is converted to acrylic acid.

The present invention relates to a novel composition of matter of lead, tellurium and oxygen, to a method of making this material and to a process for preparing unsaturated aldehydes and acids utilizing cobalt molybdate as a catalyst promoted with a composition of lead, tellurium and oxygen.

Many processes have been proposed for the production of unsaturated aldehydes and acids, particularly acrolein, methacrolein, acrylic acid and methacrylic acid. One method that has been proposed involves the vapor phase oxidation of propylene or isobutene in the presence of molecular oxygen over a cobalt molybdate catalyst. This process results in unsatisfactory yields. A suggested improvement of this process involves the incorporation of tellurium dioxide in the cobalt molybdate as a promoter. Although the yields are improved, this process involves the serious disadvantage that tellurium dioxide is very poisonous and is lost under reaction conditions, i.e. about 450° C. Therefore, the process requires the recovery of the vaporized tellurium dioxide as a safety procedure and it requires the continual replenishment of the catalyst with this tellurium dioxide promoter.

We have unexpectedly discovered a novel composition of lead, tellurium and oxygen, which significantly promotes the activity of cobalt molybdate for the vapor phase oxidation of propylene and isobutene to produce exceptionally high yields of the desired unsaturated aldehydes and unsaturated acids while minimizing the yields of the less desired saturated acids and undesired carbon dioxide. A further aspect of this invention involves the vapor phase oxidation of acrolein and methacrolein to the corresponding unsaturated acid in good yield using the novel promoted catalyst. Not only are the yields of desired products exceptionally high, but also the novel promoted catalyst of this invention retains excellent activity over prolonged periods of operation without losing the promoter. Of further advantage is the fact that this novel promoted catalyst can be utilized in this process either unsupported or supported on a suitable carrier.

The novel composition of matter is conveniently prepared by the high temperature oxidation of lead ditelluride using molecular oxygen. When prepared in this manner it contains from about 46 to about 60 weight percent lead, from about 30 to about 40 weight percent tellurium, and from about 10 to about 15 weight percent oxygen. A substantially completely oxidized sample will contain about 50.65 weight percent lead, about 35.60 weight percent oxygen. It is known that certain tellurides such as cobalt telluride decompose at elevated temperatures in the presence of molecular oxygen to the individual oxides such as cobalt oxide and tellurium dioxide, therefore, it is unexpected that lead ditelluride does not decompose under these conditions to tellurium dioxide and lead oxide but rather that it forms the novel composition of matter of this invention.

Lead ditelluride is a gray crystalline material having a distinct and characteristic X-ray diffraction pattern. Lead ditelluride is conveniently utilized in a powdered form to assist in its oxidation to the lead-tellurium-oxygen promoter material. In carrying out this oxidation, it is slowly heated in molecular oxygen, such as air, to an elevated temperature and preferably held at an elevated temperature for sufficient time to complete the oxidation. In this process the oxidized lead ditelluride is converted to a molten mass which solidifies upon cooling to a glasslike material. When this substantially fully oxidized glass-like material is powdered and subjected to appropriate analytical techniques including X-ray diffraction, X-ray fluorescence, neutron activation analysis and differential thermal analysis, it is determined that no lead oxides, lead ditelluride or tellurium dioxide is present and that it is amorphous to X-rays.

This novel composition is prepared by heating lead ditelluride in the presence of air at a temperature between about 500° C. and about 1000° C. and preferably within the range of about 600° C. to about 900° C. to oxidize the material. For substantially complete oxidation the time of heating is in part dependent upon the temperature at which oxidation takes place, for example, when powdered lead ditelluride is heated to about 650° C., complete oxidation requires a time of about one to four hours. The duration of this complete reaction can be predetermined from prior results or it can be conducted until no further gain in weight is evidenced. The reaction involves a small loss of tellurium as tellurium dioxide, which evolves slowly during the reaction, with a net weight gain as a result of the oxidation. Upon cooling, this molten mass solidifies to a glassy material which is conveniently ground to a fine powder for further use as a promoter in this invention.

Although the substantially completely oxidized lead ditelluride material as described is most preferred for use as a promoter for cobalt molybdate, the partial oxidation product containing as little as about one weight percent oxygen can also be used; however, the more preferrred promoter material contains about 46 to about 60 weight percent lead, about 30 to 40 weight percent tellurium and about 10 to about 15 weight percent oxygen. Partially oxidized promoter material, when used in conjunction wth cobalt molybdate in the presence of oxygen for the oxidation of unsaturated hydrocarbons hereunder, will oxidize to the more fully oxidized state within the ranges specified. Also included as a promoter material herein is the glass-like material formed by heating appropriate quantities of lead oxide with tellurium dioxide.

The catalyst used in this invention is promoted cobalt molybdate. Cobalt molybdate as used in the claims herein is defined as a compound of molybdenum, cobalt and oxygen having the formula $CoMoO_4$, or it is a mixture of this compound and one or more of the oxides of molybdenum and cobalt, or it can be a mixture of the oxides of molybdenum and cobalt. The exact composition of the cobalt molybdate is controlled to a substantial extent by the procedure used for its preparation. The cobalt molybdate is conveniently and preferably prepared by precipitating the cobalt molybdate from a solution of a cobalt compound and a molybdenum compound. The nature of the cobalt molybdate prepared by such a procedure is determined in part by the conditions utilized and the proportion of the cobalt and molybdenum compounds used. It is preferred that the proportion of cobalt compound to molybdenum compound be adjusted so that the ratio of cobalt to molybdenum in the catalyst is substantially about one to one, although the ratio can vary within moderately wide limits.

The promoted cobalt molybdate catalyst of this invention can conveniently be produced by thoroughly mixing powdered cobalt molybdate as above described and the powdered glass-like composition containing lead tellurium and oxygen and calcining the mixture in air at elevated temperature. For catalytic purposes the promoted catalyst desirably contains from about .1 to about 20 weight percent of the promoter and preferably from about .5 to about 10 weight percent of the promoter. Alternatively, the promoted catalyst can be prepared with substantially equal efficiency by grinding cobalt molybdate with lead ditelluride in water to form a thick homogeneous paste, drying the mixture and then calcining it in air at the conditions required for the desired promoter composition. In the conversion of lead ditelluride to the lead-tellurium glass promoter material, about a 20 percent weight gain is effected. Therefore, the appropriate amount of lead ditelluride for use in this alternative procedure is readily ascertainable. In the production of these promoted catalysts by these procedures utilizing lead ditelluride to form the promoter, the product exhibits an X-ray diffraction pattern identical to that of the cobalt molybdate initially used, which fact establishes that the cobalt molybdate is not changed by the procedure and that no lead ditelluride or tellurium dioxide is present in the final product.

In the process hereunder for oxidizing the olefin to the corresponding aldehyde and acid, a mixture of the olefin, of molecular oxygen, and an inert diluent in the vapor phase are passed over the promoted catalyst at an elevated temperature. Suitable inert diluents such as nitrogen, water vapor, the noble gases, etc., are added to vary the proportion of reactants in the feed stream to control the reaction stoichiometry and to avoid the explosive limits of the feed gas mixture. Since air is a very convenient source of molecular oxygen, the inert diluent can suitably be nitrogen from the air with water vapor added to provide a suitable concentration of the reactants. The hydrocarbon can suitably be from about one volume percent to about 50 volume percent of the feed gas mixture and preferably about five volume percent to about 30 volume percent. The oxygen concentration in the feed gas mixture can be from about three volume percent to about 50 volume percent of the feed gas mixture and preferably from about five volume percent to about 30 volume percent. The ratio of hydrocarbon to oxygen in the feed gas mixture can vary from between about 2.0 to about 0.25 and preferably from about 1.0 to about 0.5.

The highest selectivity to useful products, e.g. acrylic acid, acrolein and less desirably acetic acid in the case of propylene oxidation hereunder, occurs when the promoter is about .5 to 5 percent of the unsupported catalyst composition and therefore this range is the most preferred for this process. Within this range the total conversion also reaches a maximum, and additionally the selectivity to acrylic acid also is the greatest. As the amount of promoter is increased, the proportion of acrolein increases as well as the proportion of highly undesired carbon dioxide. Since carbon dioxide is the primary undesired by-product, it is desirable to carry out the reaction under conditions which maximize total conversion and selectivity to the desired product distribution and minimize carbon dioxide production. Acetic acid is the least desired of the usable products and in all desirable ranges of operation is a very minor product. These same relations apply in the conversion of isobutene to methacrolein and methacrylic acid.

The conversion, selectivity and product distribution are, in part, a function of the reaction temperature. As the temperature is raised from ambient conditions, the initial reaction although of low conversion is highly selective to the desirable oxygenated products. As the temperature is further increased, the selectivity gradually decreases up to about 500° C. at which the decrease occurs at a more rapid rate. The conversion on the other hand increases and peaks at about 450° C. and then decreases as the carbon dioxide production becomes of greater significance. As a result, the preferred temperature of operation is from about 370° C. to about 550° C. and the most preferred range of temperature for carrying out the process is between about 400° C. and about 475° C. As the temperature is increased in this range, the amount of acrolein constantly decreases while that for acrylic acid increases and reaches a maximum of about 475° C. Therefore, the temperature is of significance in establishing not only the conversion and selectivity but also in determining the product distribution.

The space time of the feed gas mixture with the unsupported catalyst, that is, the reciprocal of the gas hourly space velocity, is also of significance with respect to the total conversion, selectivity and product distribution. As the space time is decreased, the selectivity to desirable products increases while the total conversion decreases. Also in decreasing the space time the proportion of aldehyde increases while the proportion of the unsaturated acid and of carbon dioxide decreases. We can suitably conduct our process for the conversion of the olefin to the unsaturated aldehyde and unsaturated acid when a gas hourly space velocity with respect to the olefin of from about 30 to about 480 is utilized and preferably from about 60 to about 180.

The promoted catalyst can be supported on a suitable inert support such as alumina, silica, zirconia, silicon carbide, and the like. In the supported catalyst the same ratio for the cobalt molybdate to the promoter as used in the unsupported catalyst is satisfactory. Unexpectedly, we have discovered that the supported catalyst has a very high selectivity, up to 95 percent or greater with the main product constituting the unsaturated aldehyde and with very little formation of the saturated acid. Therefore, the use of a supported catalyst is particularly suitable in this process for producing the unsaturated aldehyde. When the unsaturated acid is the preferred product, the unsupported catalyst is preferred. A correlation of the catalyst composition, temperature, space velocity and feed gas composition is undertaken to maximize the production of the unsaturated acid, that is acrylic acid or methacrylic acid. When this unsaturated acid is the desired product, the unsaturated aldehyde can be separated from the product mixture and can separately be converted to the corresponding unsaturated acid over the promoted catalyst of this invention or it can conveniently be recycled to the olefin-containing feed gas mixture for conversion to the unsaturated acid.

When the promoted catalyst of this invention is used over extended periods of time, the selectivity and product distribution remain substantially constant. However, the conversion decreases from its initial amount to a lower value. The amount of decrease in conversion over long periods of operation is believed to be a result of polymerization of the unsaturated aldehyde and acid on the catalyst surface. This decline in activity will decrease if the space time is decreased and if the olefin to oxygen ratio is decreased such that a minor loss of conversion over long periods of operating time is experienced. The used catalyst can be readily restored to its initial activity by heating in air at reaction temperature.

The following examples are illustrative of our invention and are not intended as a limitation thereof.

EXAMPLE 1

A 3.17 gram sample of lead ditelluride power, $PbTe_2$, was slowly heated in a crucible in air to a maximum temperature of 900° C. over a period of about three hours and was held at this temperature for an additional 16 hours. The PbTe$_2$ powder was converted to a yellow-green mass which was sufficiently fluid at 640° C. to creep slowly when the crucible was tilted. It solidified upon cooling to a glassy material weighing 3.89 grams. The glass was ground to a fine powder and its stoichiometry was determined to be 50.65 weight percent lead, 35.60 weight percent tellurium, and the remainder oxygen (13.75 percent) by X-ray fluorescence, neutron activation analysis, and gravimetric techniques. If a free oxide of tellurium were present, it would be expected to be tellurium dioxide, however, the preparation was carried out at a temperature above the sublimation temperature of tellurium dioxide. Lead ditelluride and the oxides of lead and tellurium form distinct and characteristic X-ray diffraction patterns. X-ray diffraction analysis of the powdered glassy product disclosed that it was amorphous to X-rays and that none of the crystalline oxides of lead or tellurium or lead ditelluride or the free elements was detected.

EXAMPLE 2

A solution of 582 grams of cobalt nitrate and 354 grams of ammonium molybdate was prepared using 1,000 cc. of water. The precipitate obtained by slowly adding 320 cc. of 50 percent ammonium hydroxide to the solution was filtered and washed with cold water then oven dried at 110° C. for 16 hours. It was then calcined for 24 hours in air at 550° C. and the surface area of the resulting cobalt molybdate was determined to be 4.0 m.$^2$/g. by krypton adsorption.

EXAMPLE 3

After grinding the glass-like composition as produced in Example 1 to a fine powder, 0.2 gram of this powder was further ground with 20 grams of cobalt molybdate as produced in Example 2. The powdered mixture was oven dried overnight at 110° C. and then calcined in air at 550° C. for 24 hours. The resulting mixture was a granular material that was cracked to 10 to 20 mesh size. The X-ray diffraction pattern of this product was identical to the pattern of the starting cobalt molybdate.

EXAMPLE 4

A thick homogeneous paste was formed by grinding in water 20 grams of cobalt molybdate as prepared in Example 2 and 0.2 gram of lead ditelluride. This paste was oven dried at 110° C. for 16 hours and calcined in air at 550° C. for 24 hours. The X-ray diffraction pattern of this product was identical to the pattern of the initial cobalt molybdate. The resulting product was determined to be a mixture of cobalt molybdate and lead-tellurium glass having a surface area of 3.0 m.$^2$/g. as determined by krypton adsorption.

EXAMPLE 5

A supported catalyst was made by grinding in water 20 grams of cobalt molybdate as prepared in Example 2 with 0.2 gram of lead ditelluride until a thick homogeneous paste was formed. Approximately one-third of this paste was incorporated into 50 grams of a commercially available form of an alpha alumina having a surface area of 0.2 m.$^2$/g. by slurrying the two together. The slurry was oven dried overnight at 110° C. and then calcined in air at 550° C. for 24 hours. The resulting granular powder consisted of about five weight percent cobalt molybdate and the remainder lead-tellurium glass and alpha alumina.

EXAMPLE 6

A supported catalyst was produced in the same manner as described in Example 5 except that 0.2 gram of the lead-tellurium glass material as produced in Example 1 was powdered and used in place of lead ditelluride. The resulting granular powder had a surface area of approximately 0.70 m.$^2$/g. It consisted of cobalt molybdate plus lead-tellurium glass and alpha alumina.

EXAMPLE 7

A series of runs were conducted to determine the catalytic activity of a number of solid materials in the reaction of propylene with oxygen to produce acrolein and acrylic acid. Several of the products of the preceding examples were used as indicated in Table I. The reactor was constructed of 22 mm. O.D. quartz tubing, 42 cm. in length, with a 5 mm. thermowell extending the length of the catalyst zone. The solid material undergoing test was mixed with an equal volume (10 cc.) of silicon carbide. Silicon carbide was placed above the catalyst bed to serve as a gas mixer and a preheat section. The reactor was heated by a tube furnace equipped with a temperature controller. Propylene and air were metered into the heating section where they were mixed with steam before contacting the catalyst. The feed streams consisted of 11 volume percent propylene, 55 volume percent air and 34 volume percent steam.

At the start of each run, air was slowly passed through the reactor while the catalyst was brought to the reaction temperature of 435° C. After one hour of pretreatment with air, the reactor was flushed with nitrogen for 15 minutes and then the propylene, air and steam were metered into the reactor at the specified rates at a total pressure of one atmosphere and a flow rate to provide a space time with the catalyst of 3.3 seconds based on the total gas flow. The percent conversion and product distribution for two-hour runs are listed in Table I in which the products are specified in mol percent.

TABLE I

| Catalyst | Conversion | Acrylic acid | Acrolein | Acetic acid | CO$_2$ |
|---|---|---|---|---|---|
| PbTe$_2$ | Inactive | | | | |
| Example: | | | | | |
| 1 | Inactive | | | | |
| 2 | 23 | 28.0 | 30.9 | 11.0 | 30.0 |
| 2 plus 2 weight percent TeO$_2$ | 45 | 50.3 | 28.5 | 4.2 | 17.0 |
| 3 | 50.8 | 54.7 | 31.7 | 3.9 | 9.6 |
| 4 | 44.1 | 56.5 | 22.2 | 5.0 | 16.3 |

These results show that initial activity of a mixture of cobalt molybdate and the promoter of this invention is significantly superior for the production of upgraded products particularly acrylic acid than the initial activity of cobalt molybdate-tellurium dioxide mixture before it has lost a significant amount of its tellurium dioxide.

EXAMPLE 8

A 25 cc. quantity of the catalyst as described in Example 5 was used in the conversion of propylene utilizing the same procedures and conditions as described in Example 7. The propylene conversion was 40.2 percent per pass with 65.4 percent of the converted propylene going to acrolein, 29.2 percent to acrylic acid, 0.6 percent to acetic acid and 4.8 percent to carbon dioxide.

EXAMPLE 9

A 25 cc. sample of the catalyst as prepared in Example 6 was tested as in the preceding example. The propylene conversion was 42 percent per pass with 63.4 percent of the converted propylene going to acrolein, 31.1 percent to acrylic acid, 0.8 percent to acetic acid and 4.7 percent to carbon dioxide.

It is to be understood that the above disclosure is by way of specific example and that numerous modifications and variations are available to those of ordinary skill in the art without departing from the true spirit and scope of the invention.

We claim:
1. A process which comprises reacting a feed mixture of oxygen, an inert diluent and a material selected from the group consisting of propylene, isobutene, acrolein, methacrolein, and mixtures thereof at a temperature be- tween about 370° C. and about 550° C. in the presence of a catalyst consisting essentially of cobalt molybdate and about 0.1 to about 20 weight percent of a catalytic promoter prepared by heating lead ditelluride in the presence of molecular oxygen at a temperature between about 500° C. and about 1000° C.

2. A process in accordance with claim 1 in which the material is isobutene and a mixture containing methacrolein and methacrylic acid is produced.

3. A process in accordance with claim 2 in which the temperature is between about 400° C. and about 475° C.

4. A process in accordance with claim 2 in which the methacrolein is recycled and added to said feed mixture.

5. A process in accordance with claim 1 in which the material is propylene and a mixture containing acrolein and acrylic acid is produced.

6. A process in accordance with claim 5 in which the temperature is between about 400° C. and about 475° C.

7. A process in accordance with claim 6 in which the acrolein is recycled and added to said feed mixture.

8. A process in accordance with claim 1 in which said catalytic promoter comprises from about 46 to about 60 weight percent lead, from about 30 to about 40 percent tellurium and about 10 to about 15 percent oxygen.

9. A process in accordance with claim 8 in which said catalytic promoter comprises about 51 percent lead, about 36 percent tellurium and about 14 percent oxygen.

10. A process in accordance with claim 9 in which said catalyst comprises from about 0.5 to about 10 percent of said catalytic promoter.

References Cited

UNITED STATES PATENTS

| 3,467,716 | 9/1969 | Kiff et al. | 260—533 N |
| 3,527,716 | 9/1970 | Nemer et al. | 260—533 N |

FOREIGN PATENTS

| 839,808 | 6/1960 | Great Britain | 260—533 N |
| 904,304 | 8/1962 | Great Britain | 260—533 N |
| 971,666 | 9/1964 | Great Britain | 260—533 N |
| 1,035,147 | 7/1966 | Great Britain | 260—533 N |

LORRAINE A. WEINBERGER, Primary Examiner

R. O. KELLY, Assistant Examiner

U. S. Cl. X.R.

252—469; 260—533 N, 604 R